United States Patent
Liu et al.

(10) Patent No.: US 12,348,959 B2
(45) Date of Patent: Jul. 1, 2025

(54) SESSION REQUEST METHOD AND APPARATUS, TERMINAL, AND STORAGE MEDIUM

(71) Applicant: ZTE CORPORATION, Guangdong (CN)

(72) Inventors: Yuze Liu, Guangdong (CN); Shilin You, Guangdong (CN); Jin Peng, Guangdong (CN); Zhaoji Lin, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 237 days.

(21) Appl. No.: 18/033,374

(22) PCT Filed: Sep. 29, 2021

(86) PCT No.: PCT/CN2021/121546
§ 371 (c)(1),
(2) Date: Apr. 24, 2023

(87) PCT Pub. No.: WO2022/083433
PCT Pub. Date: Apr. 28, 2022

(65) Prior Publication Data
US 2023/0422032 A1    Dec. 28, 2023

(30) Foreign Application Priority Data
Oct. 22, 2020  (CN) .......................... 202011140382.X

(51) Int. Cl.
*H04L 29/06* (2006.01)
*H04W 12/0433* (2021.01)
(Continued)

(52) U.S. Cl.
CPC ....... *H04W 12/06* (2013.01); *H04W 12/0433* (2021.01); *H04W 12/72* (2021.01)

(58) Field of Classification Search
CPC .. H04W 12/0433; H04W 12/06; H04W 12/72
See application file for complete search history.

(56) References Cited

U.S. PATENT DOCUMENTS

2018/0227302 A1    8/2018  Lee et al.
2020/0359218 A1*  11/2020  Lee ......................... H04M 15/61
2021/0058780 A1*   2/2021  Yu .......................... H04W 12/08

FOREIGN PATENT DOCUMENTS

CN    110022206 A    7/2019
CN    112512043 A    3/2021

OTHER PUBLICATIONS

ZTE. "S3-202901 Clarification of RID in clause 6.1 for AKMA," 3GPP TSG-SA3 Meeting #101e, Vol. No., (Oct. 30, 2020).
(Continued)

*Primary Examiner* — Jeffrey C Pwu
*Assistant Examiner* — Thong P Truong
(74) *Attorney, Agent, or Firm* — McDonald Hopkins LLC

(57) ABSTRACT

A session request method, a session request apparatus, a terminal, and a storage medium are provided. The session request method includes: generating an authentication server key when a key agreement authentication is passed; determining, according to the authentication server key, a key identifier of an authentication and key management for applications (AKMA) anchor key; when the key identifier is invalid, updating the key identifier according to a mobile subscriber identification number (MSIN); and sending an updated key identifier to an application function, to request a key-based session.

13 Claims, 4 Drawing Sheets

(51) Int. Cl.
    *H04W 12/06*        (2021.01)
    *H04W 12/72*        (2021.01)

(56) References Cited

OTHER PUBLICATIONS

Ericsson. "S3-201051 pCR to TS 33.535: Optimization in AKMA key generation," 3GPP TSG-SA3 Meeting #99e, Vol. No., (May 15, 2020).
Ericsson. "S3-201049 AKMA Architecture discussion," 3GPP TSG-SA3 Meeting #99e, Vol. No., (May 15, 2020).
International Search Report mailed Dec. 30, 2021; International Patent Application No. PCT/CN2021/121546 filed Sep. 29, 2021.

* cited by examiner

SESSION REQUEST METHOD AND APPARATUS, TERMINAL, AND STORAGE MEDIUM

CROSS-REFERENCE TO RELATED APPLICATION(S)

This is a national stage application filed under 37 U.S.C. 371 based on International Patent Application No. PCT/CN2021/121546, filed Sep. 29, 2021, which claims priority to Chinese Patent Application No. 202011140382.X filed Oct. 22, 2020, the disclosures of which are incorporated herein by reference in their entireties.

FIELD

This application relates to the field of wireless communication networks, for example, to a session request method, a session request apparatus, a terminal, and a storage medium.

BACKGROUND

The fifth-generation mobile communication (5G) network architecture consists of multiple network functions (NF). For example, a unified data management (UDM) function is configured to store user subscription data permanently, and is located in a home network of user subscription; an authentication credential repository and processing function (ARPF) is configured to store long-term security credentials for authentication, and use the long-term security credentials as inputs to perform key operations; an authentication server function (AUSF) is configured to interact with the ARPF and provide authentication services; an application function (AF) is configured to manage sessions for user equipment (UE). In addition, an authentication and key management for applications (AKMA) anchor function (AKMA Anchor Function, AAnF) is also introduced into the 5G network architecture. The AAnF is located in the home network and is mainly configured to generate a key for a session between the UE and the AF, and maintain a security context between the AAnF and the UE. The AKMA technology provides end-to-end security protection from users to applications for the 5G network.

In the process of the UE accessing the 5G network, after the authentication is successful, the UE and the AUSF generate by derivation an AKMA anchor key and generate a key identifier related to the AKMA anchor key. The UE carries the key identifier to request a session from the AF, and the AF locates, according to the key identifier, a correct UDM function and an AAnF to obtain a corresponding service, ensuring session security. However, there are cases where the key identifier is invalid which causes that the network side cannot locate the AAnF or the UDM function correctly, resulting in the inability to determine whether the user has been subscribed to the AMKA or the inability to find the AKMA security context for the user, and the inability to provide users with secure and reliable services.

SUMMARY

A session request method, a session request apparatus, a terminal, and a storage medium are provided according to the present application, to ensure the validity of a key identifier in the process of session request and improve the security of the session.

A session request method is provided according to embodiments of the present application, the method includes the following.

In a case where a key agreement authentication is passed, an authentication server key is generated; according to the authentication server key, a key identifier of an AKMA anchor key is determined; in a case where the key identifier is invalid, the key identifier is updated according to a mobile subscriber identification number (MSIN); and an updated key identifier is sent to an AF to request a key-based session.

A session request apparatus is further provided according to embodiments of the present application, which includes a generation module, an identifier determining module, an update module, and a request module.

The generation module is configured to generate an authentication server key in a case where a key agreement authentication is passed; the identifier determining module is configured to determine a key identifier of an AKMA anchor key according to the authentication server key; the update module is configured to update the key identifier according to an MSIN in a case where the key identifier is invalid; and the request module is configured to send an updated key identifier to an AF to request a key-based session.

A terminal is further provided according to embodiments of the present application, which includes: a memory, a processor, and a computer program stored in the memory and executable by the processor, where the processor, when executing the computer program, implements the above-described session request method.

A computer-readable storage medium is further provided according to embodiments of the present application, a computer program is stored in the computer-readable storage medium, and the computer program, when being executed by a processor, implements the above-described session request method.

DETAILED DESCRIPTION

The present application is described hereinafter concerning the drawings and embodiments.

A session request method is provided according to embodiments of the present application, which is applicable to a terminal such as a UE and a mobile equipment (ME). In the process of the terminal accessing the network, when it is determined that a key identifier is invalid, the terminal can update the key identifier according to an MSIN, and the updated key identifier can provide valid information for an AF so that the network side can correctly locate an AAnF and a UDM function, to provide a user with secure and reliable services, and to realize a key-based secure session between the terminal and the AF.

Figure 1:
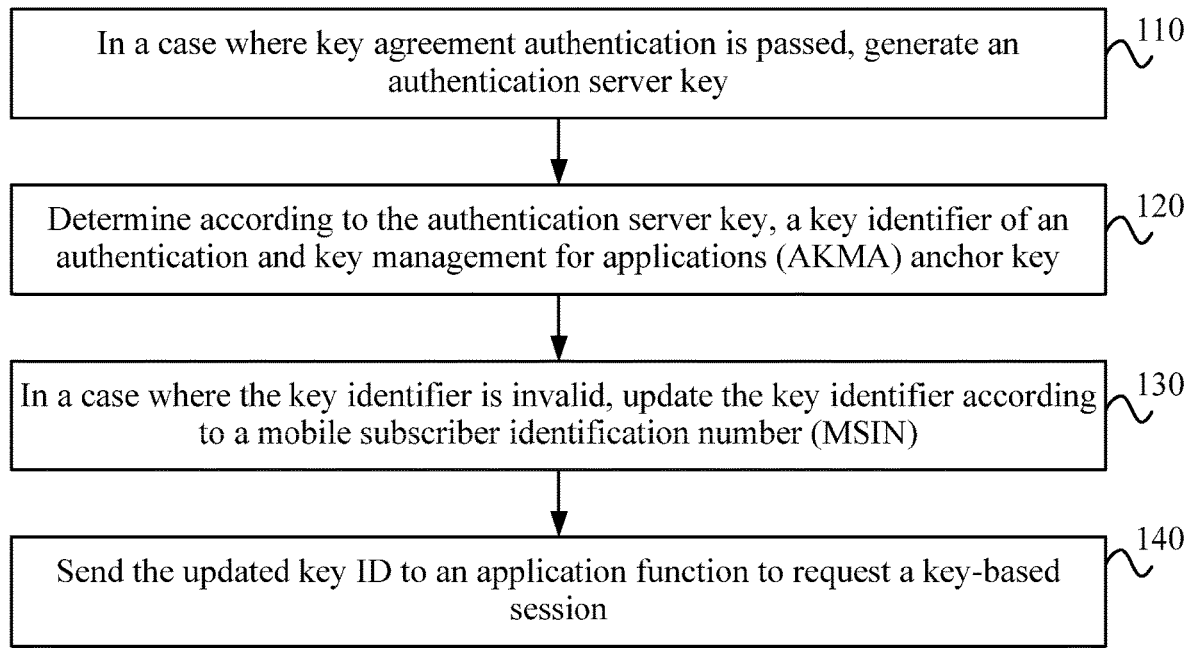
FIG. 1 is a flowchart of a session request method according to an embodiment.

FIG. 1 is a flowchart of a session request method according to an embodiment. As shown in FIG. 1, the method according to this embodiment includes an operation 110, an operation 120, an operation 130 and an operation 140.

In the operation 110, when a key agreement authentication is passed, an authentication server key is generated.

In this embodiment, before the terminal accesses the network, the terminal requests an AUSF and a UDM function to perform key agreement authentication. The AUSF is configured to generate a key for a session between the terminal and an AF and maintain a security context between the AUSF and the terminal, and the UDM function is configured to store user subscription data, determine whether the user is an AKMA subscriber, etc. After passing the key agreement authentication, the terminal generates an authentication server key.

Figure 2:
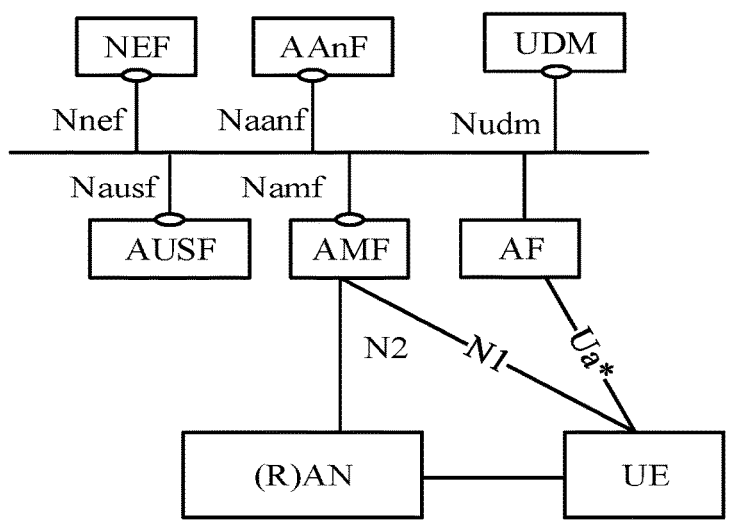
FIG. 2 is a schematic diagram of a service architecture of authentication and key management for applications according to an embodiment.

FIG. 2 is a schematic diagram of a service architecture of authentication and key management for applications according to an embodiment. As shown in FIG. 2, the UE communicates with an access network (AN) or a radio access network (RAN) through various network functions. The access management function (AMF) is configured to manage the needs of a user to access the network, and is responsible for user mobility management and non-access stratum (NAS) signaling management from the terminal to the network. The AMF has a security anchor function, and the AMF can interact with the AUSF and the UE and receive an intermediate key established for the process of authentication of the UE. Besides, for the authentication based on a universal subscriber identity module (USIM), the AMF further acquires security-related data from the AUSF. The AF is configured to manage sessions of the user equipment (UE).

The UDM function is configured to store user subscription data and is located in a home network where a user subscribes. The authentication credential repository and processing function (ARPF) is configured to store long-term security credentials for authentication and perform key operations using the long-term security credentials as input. The AUSF is configured to interact with the ARPF and provide authentication services. The AAnF is located in the home network and is mainly configured to generate a key for a session between the UE and the AF, and maintain a security context between the AAnF and the UE. The AAnF is similar to a bootstrapping server function (BSF) in a general bootstrapping architecture (GBA); an interface Ua* between the UE and the AF is similar to an interface Ua in the GBA. Nnef, Nausf, Naanf, and Namf are service-based interfaces of the NEF, AUSF, AAnF, and AMF, respectively. A network exposure function (NEF) is configured to manage network data exposed to external network, and applications in the external network can access internal data of the core network through the NEF.

In this embodiment, the terminal requests a key-based session from the AF, the AF locates the AUSF and the UDM function according to the request, key agreement authentication is performed through the AUSF and the UDM function, and after the key agreement authentication is passed, the terminal generates an authentication server key, denoted as $K_{AUSF}$.

In the operation 120, a key identifier of an authentication and key management for applications (AKMA) anchor key is determined according to the authentication server key.

In this embodiment, in a case where the key agreement authentication is passed, the terminal derives from the $K_{AUSF}$ to obtain the AKMA anchor key, denoted as $K_{AKMA}$, and generates a key identifier (AKMA-Key identifier, A-KID) related to the $K_{AKMA}$.

Figure 3:
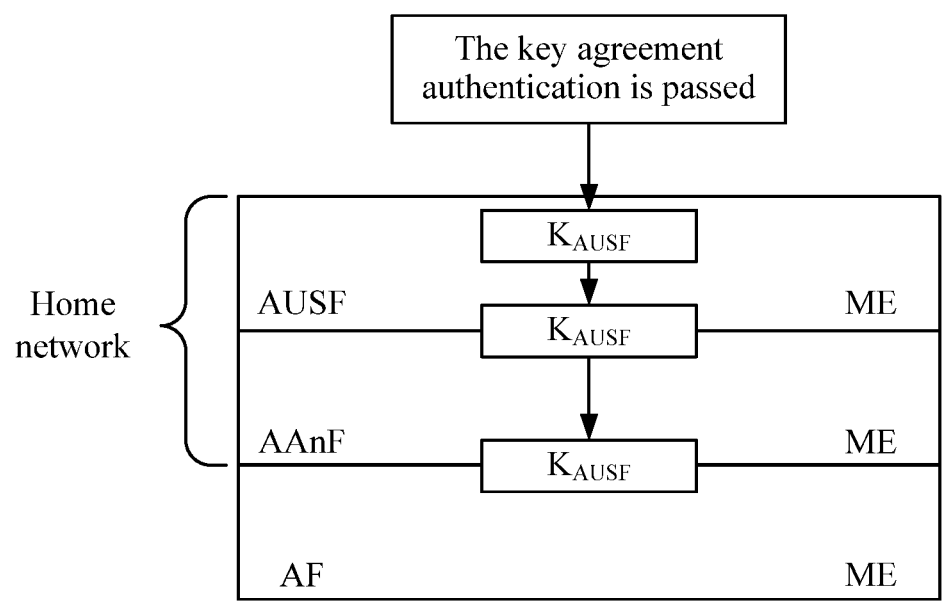
FIG. 3 is a schematic diagram of key derivation of a service architecture of authentication and key management for applications according to an embodiment.

FIG. 3 is a schematic diagram of key derivation of a service architecture of authentication and key management for applications according to an embodiment. As shown in FIG. 3, after the key agreement authentication is passed, both the AUSF and the ME can generate the authentication server key $K_{AUSF}$, and then derive the AKMA anchor key $K_{AKMA}$ from the $K_{AUSF}$, and then derive from the $K_{AKMA}$ to obtain an application key KAF. In this process, if the AUSF receives an AKMA instruction from the UDM function, the AUSF stores the $K_{AUSF}$, and generates a $K_{AKMA}$ and A-KID from the $K_{AUSF}$ after the authentication is successful; before starting communication with the AKMA application server, the ME also generates the K AKMA and A-KID from the $K_{AUSF}$. The K AKMA can only be updated through the key agreement authentication.

In the operation 130, in a case where the key identifier is invalid, the key identifier is updated according to a mobile subscriber identification number (MSIN).

In this embodiment, the key identification A-KID of the anchor key K AKMA includes two parts: a user name (Username) and a domain name of the home network (Realm). The Username includes a routing indicator (RID) and a temporary user identifier; and the Realm includes a home network identifier. The RID consists of 1 to 4 bits of decimal digits. According to the combination of the RID and the home network identifier, signaling from the user can be transmitted to the AUSF and the UDM function in a designated network. If the UDM function cannot be located correctly, it cannot be determined whether the user has been subscribed to the AMKA; and if the AAnF cannot be located correctly, the AKMA security context cannot be found for the user.

In this embodiment, the A-KID being invalid mainly means that the RID in the A-KID is invalid. For example, the RID is not configured, a set default value or a invalid value, or the RID is inconsistent with the current situation that the anchor key is generated, etc. In this case, the network side cannot correctly locate the AAnF and the UDM function, and cannot provide reliable services for users, resulting in the AF unable to start application-layer encryption correctly. In some embodiments, the AUSF and the UDM function each is a network element in the home network, the UDM function and the AUSF each has a subscription permanent identifier (SUPI), and the UDM function and the AUSF each can use the SUPI to locate the AAnF that stores the security context of AKMA for the user. If the terminal uses the international mobile subscriber identification number (IMSI) as the SUPI and uses a null algorithm to access the network, the network side can use the SUPI to locate the AUSF and the UDM function. In this case, the RID may be an invalid value.

In this embodiment, in a case where the A-KID is invalid, the terminal can select specific bits from the MSIN of the SUPI and fill the RID with the selected bits, to obtain a valid RID, with which the A-KID is updated, providing basis for the key-based session service between the terminal and the AF.

In the operation 140, an updated key identifier is sent to an application function to request a key-based session.

In this embodiment, the terminal updates the invalid A-KID, and carries an updated A-KID in the process that the terminal initiates a request to the AF so that the AF can correctly locate the AAnF and the UDM function to obtain corresponding services and ensure session security.

In an embodiment, the key identifier being invalid includes: the RID in the key identifier being null, an invalid value, or a default value. In this embodiment, the invalid RID may be caused by the use of a null algorithm or not being configured, which causes that the RID may be null, an invalid value (e.g., the value of the RID is beyond a value range of a path identifier in the practical application), or a default value (e.g., each bit of the RID is 0).

In an embodiment, the operation 130 which includes updating the key identifier according to an MSIN includes: determining the number of bits of the RID; selecting, according to a local policy, values of corresponding number of bits from the MSIN, fill the RID with the values of the corresponding number of bits; and updating the key identifier according to the filled RID.

In this embodiment, the updating the key identifier lies in updating the RID, that is, to replace the invalid RID in the Username with the values of the corresponding number of bits in the MSIN of the SUPI. The terminal can select the corresponding number of bits from the MSIN according to the local policy and fill the RID with the values of the corresponding number of bits selected from the MSIN, to obtain a valid RID, and the A-KID can be updated with the valid RID. The number of bits selected from the MSIN is up to the number of bits of RID, and which bits of the MSIN are selected can be determined according to the local policy. For example, values of the first few bits in the MSIN, values of the intermediate bits in the MSIN, values of the last few bits in the MSIN, or values of bits starting from a specific position in the MSIN can be selected.

In an embodiment, the local policy includes one of the following: selecting values of first corresponding number bits from the MSIN; selecting values of corresponding number of bits starting from a set position from the MSIN; or, selecting values of last corresponding number of bits from the MSIN.

For example, the first letters of the MSIN or the first few bits of digits of the MSIN may be used to determine the home location register (HLR, which can correspond to the UDM function), so the first letters of the MSIN or the first few bits of digits of the MSIN can be used to fill the RID. If the number of bits of the RID is four, the MSIN is 0123456789, according to the local policy which is selecting the first four bits, the "0123" can be filled in the RID to obtain the updated A-KID. For another example, if the local policy is to select the $3^{rd}$ to $6^{th}$ bits of the MSIN, "2345" are filled in the RID.

In an embodiment, the method further includes: through an authentication and key agreement (AKA) mechanism, or an AKA extensible authentication protocol (EAP), namely EAP-AKA', the AUSF and the UDM function are requested to perform key agreement authentication.

In this embodiment, the terminal requests the AUSF and the UDM function to perform key agreement authentication through the AKA mechanism or the EAP-AKA'. In the process of key agreement authentication, the AUSF interacts with the UDM function to obtain authentication information, such as authentication credentials which include an AKA authentication vector (AV) or etc. The authentication may be performed by using an authentication response (Nudm_UE Authentication Get Request) service operation. The security anchor function (SEAF) associated with the AMF can initiate authentication to the terminal in any process when the SEAF establishes a signaling connection with the terminal. If authentication needs to be initiated, the SEAF can call the Nausf_UEAuthentication service by sending a message to the AUSF, and the message contains a subscription concealed identifier (SUCI) or the SUPI. If the SEAF has a valid globally unique temporary UE identity (GUTI) and re-authenticates the terminal, the message includes the SUPI, otherwise, it includes the SUCI. The UDM function may instruct the AUSF whether to generate an AKMA anchor key for the terminal.

In an embodiment, the method further includes: determining an application key according to the AKMA anchor key to encrypt an application layer.

In this embodiment, the terminal determines the application key $K_{AF}$ according to the $K_{AKMA}$, and on this basis, the AF can correctly locate the AAnF and the UDM function, thereby correctly starting the application layer encryption and ensuring session security.

In an embodiment, the MSIN pertains to the SUPI, and a type of the SUPI is the IMSI.

In this embodiment, there are two types of user identifiers in total: the SUCI and the SUPI. The SUPI may be an IMSI or a network access identifier (NAI). The SUCI consists of six parts: the type of the SUPI, the home network identifier, the RID, a protection scheme identifier, a home network public key identifier, and scheme output.

The type of the SUPI (SUPI type), can be valued from 0 to 7, where the value of 0 indicates that the SUPI is an IMSI, and the value of 1 indicates that the SUPI is an NAI. The home network identifier is used to identify subscribers in the home network, and in a case where the SUPI is an IMSI, the IMSI is composed of a mobile country code (MCC), a mobile network code (MNC) and an MSIN. The RID is allocated by the home network operator, and the RID and the home network identifier are combined to instruct network signaling to be transmitted to the AUSF and the UDM function which provide services to the subscriber. The protection scheme identifier is used to indicate null-scheme or non-null-scheme. The home network public key identifier is used to indicate an identifier of a public key for protecting the SUPI provided by the home network, and in the case of null-scheme, the home network public key identifier is valued as 0. The scheme output includes the MSIN of the IMSI or the NAI in the case of null-scheme, and includes values of the MSIN and NM encrypted by an elliptic curve in the case of non-null-scheme.

Figure 4:
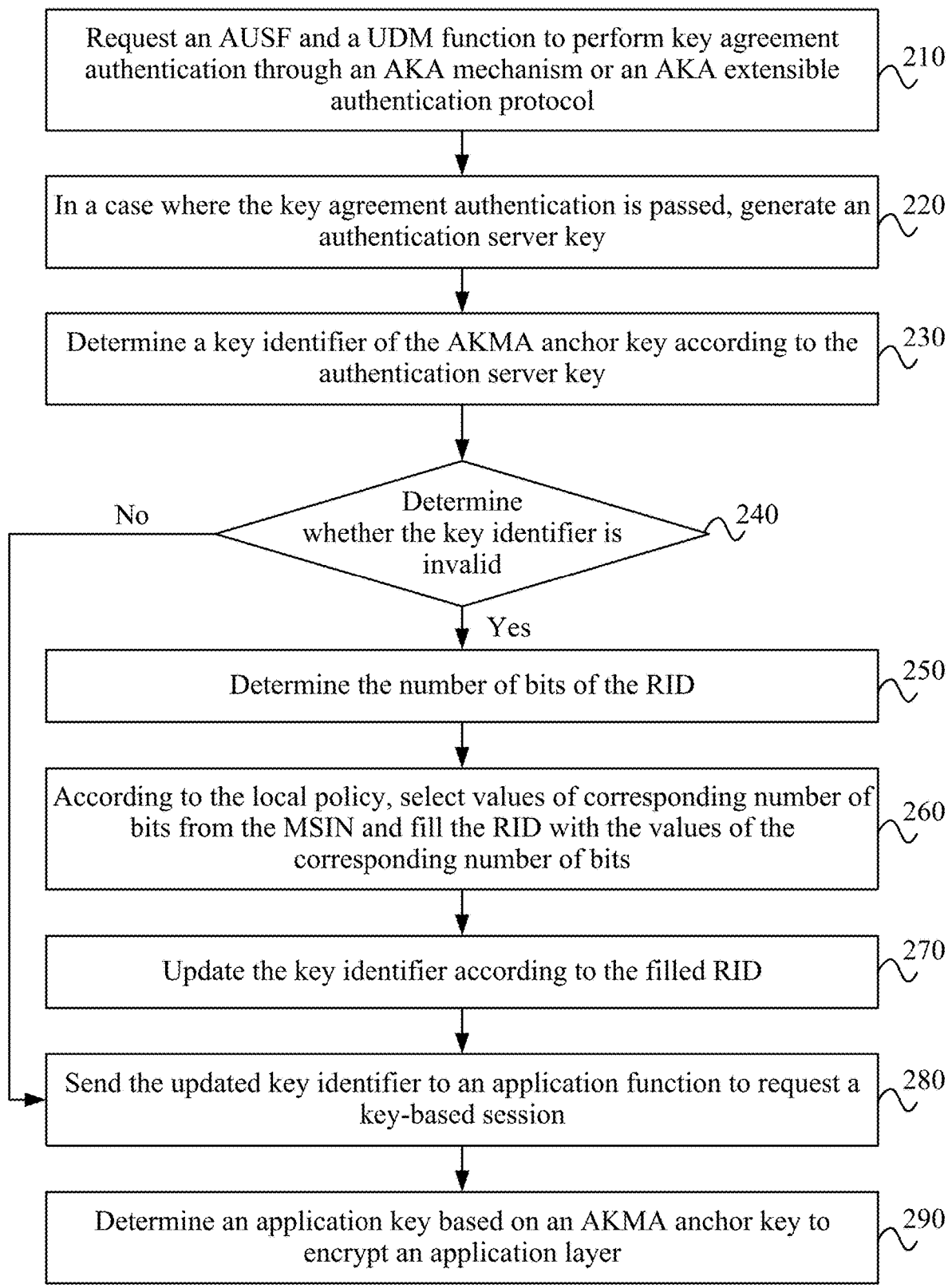
FIG. 4 is a flowchart of a session request method according to another embodiment.

FIG. 4 is a flowchart of a session request method according to another embodiment. The process of a terminal accessing the network and requesting a session is described in this embodiment based on the foregoing embodiments. For technical details not described in detail in this embodiment, reference may be made to any of the above-described embodiments.

As shown in FIG. 4, the method according to this embodiment includes operations 210 to 290.

In the operation 210, an AUSF and a UDM function are requested to perform key agreement authentication through an AKA mechanism or an AKA extensible authentication protocol.

In this embodiment, the terminal requests the AUSF and the UDM function to perform key agreement authentication through the AKA mechanism or the EAP-AKA'. In the process of the key agreement authentication, the AUSF interacts with the UDM function to obtain authentication information. The authentication may be performed by using the authentication response service operation. The UDM function may instruct the AUSF whether to generate an AKMA anchor key for the terminal. In the embodiments of the present application, the user of the terminal is an AKMA subscriber.

In the operation 220, in a case where the key agreement authentication is passed, an authentication server key ($K_{AUSF}$) is generated.

In the operation 230, a key identifier of an AKMA anchor key is determined according to the authentication server key.

In this embodiment, the terminal may derive according to the $K_{AUSF}$ to obtain an AKMA anchor key $K_{AKMA}$ and a key identifier A-KID.

In the operation 240, it is determined whether the key identifier is invalid, and if the key identifier is invalid, operation 250 is performed; otherwise, operation 5280 is performed.

In this embodiment, the terminal determining whether the A-KID is invalid, can be performed by determining whether the RID in the A-KID is a default value, an invalid value, or is not configured (null). The invalidity of the A-KID herein may be caused by that the terminal uses a null algorithm to access the network or by that the RID is not configured. If the RID is the default value, the invalid value or not configured, the A-KID is invalid, otherwise, the A-KID is valid.

In the operation 250, the number of bits of the RID is determined.

In the operation 260, according to the local policy, values of the corresponding number of bits are selected from the MSIN, and the RID are filled with the values of the corresponding bits.

For example, the IMSI is 234150123456789, i.e., MCC=234, MNC=15, MSIN=0123456789, RID is 000, the key identifier of the home network is 27, and the SUCI in the case of null-scheme is 0, 234, 15, 000, 0, 0 and 0123456789, the SUCI in the case of non-null-scheme is 0, 234, 15, 000, 1, 27, <elliptic curve cryptography ephemeral public key value>, <encrypted 0123456789> and <Media Access Control layer (MAC) Tag Value>. In this case, as the RID is 000, the RID is an invalid RID, and as the number of bits of the RID is 3, the $4^{th}$ to $6^{th}$ bits in the bits of the MSIN can be selected according to the local policy, and "345" are filled into the RID, and in the updated A-KID, the RID is 345.

For another example, the IMSI is 234150123456789, i.e., MCC=234, MNC=15, MSIN=0123456789, RID is 9999, the home network key identifier is 27, and the SUCI in the case of null-scheme is 0, 234, 15, 000, 0, 0 and 0123456789, the SUCI in the case of non-null-scheme is 0, 234, 15, 000, 1, 27, <elliptic curve cryptography ephemeral public key value>, <encrypted 0123456789> and <MAC Tag Value>. In this case, as the RID is 9999, in the case where 9999 is set as a default value or an invalid value, the RID is invalid, and as the number of bits of the RID is 4, the first 4 bits in the bits of MSIN can be selected according to the local policy, and "0123" are filled into the RID, and in the updated A-KID, the RID is 0123. If the local policy is to select the $3^{rd}$ to $6^{th}$ bits in the MSIN, then "2345" are filled in the RID, and in the updated A-KID, the RID is 2345.

In the operation 270, the key identifier is updated according to the filled RID.

In this embodiment, the key identifier being updated according to the new RID mainly refers to replacing the RID in the username of the key identifier with values of the corresponding number of bits in the MSIN.

In the operation 280, the updated key identifier is sent to an application function to request a key-based session.

In this embodiment, if the A-KID is invalid, values of the corresponding number of bits are selected from the MSIN according to a local policy, and the RID are filled with the values of the corresponding number of bits, to obtain an updated A-KID and the updated A-KID is sent to the AF. In a case where the A-KID is valid, the A-KID is directly sent to the AF.

In the operation 290, an application key is determined according to the AKMA anchor key to encrypt an application layer.

In this embodiment, the terminal determines the application key $K_{AF}$ according to the $K_{AKMA}$, and on this basis, the AF can correctly locate the AAnF and the UDM function, thereby correctly starting the application layer encryption and ensuring session security. The network side provides the terminal with secure and reliable services based on the AKMA architecture.

Figure 5:
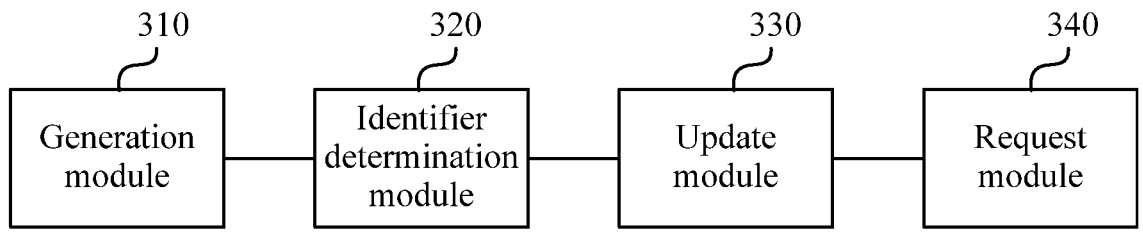
FIG. 5 is a schematic structural diagram of a session request apparatus according to an embodiment.

A session request apparatus is further provided according to an embodiment of the present application. FIG. 5 is a schematic structural diagram of a session request apparatus according to an embodiment. As shown in FIG. 5, the session request apparatus includes a generation module 310, an identifier determining module 320, an update module 330, and a request module 340.

The generation module 310 is configured to generate an authentication server key in a case where a key agreement authentication is passed; the identifier determining module 320 is configured to determine a key identifier of an AKMA anchor key according to the authentication server key; the update module 330 is configured to update the key identifier according to an MSIN when the key identifier is invalid; the request module 340 is configured to send an updated key identifier to an AF to request a key-based session.

In the session request apparatus according to this embodiment, when the key identifier is invalid, the key identifier can be updated according to an MSIN, and the updated key identifier can provide valid identifier information for the AF so that the network side can correctly locate the AAnF and the UDM function to provide the user with secure and reliable services and implement a key-based secure session between the UE and the AF.

In an embodiment, the key identifier being invalid includes the RID in the key identifier is null, an invalid value, or a default value.

In an embodiment, the update module 330 is configured to: determine the number of bits of the RID; according to a local policy, select values of the corresponding number of bits from the MSIN; fill the RID with the values of the corresponding number of bits; and update the key identifier according to the filled RID.

In an embodiment, the local policy includes one of: selecting values of first corresponding number of bits from the MSIN; selecting values of corresponding number of bits starting from a set position from the MSIN; or, selecting values of last corresponding number of bits from the MSIN.

In an embodiment, the session request apparatus further includes an authentication module, and the authentication module is configured to request an AUSF and a UDM function to perform key agreement authentication through an AKA mechanism or an AKA extensible authentication protocol.

In an embodiment, the MSIN pertains to a SUPI; and a type of the SUPI is an IMSI.

In an embodiment, the session request apparatus further includes an encryption module, and the encryption module is configured to determine an application key according to the AKMA anchor key to encrypt an application layer.

The session request apparatus provided in this embodiment pertains to the same concept as the session request method provided in the above embodiments. For technical details not described in detail in this embodiment, reference may be made to any of the above embodiments, and this embodiment has the same effects as those achieved through executing the session request method.

Figure 6:
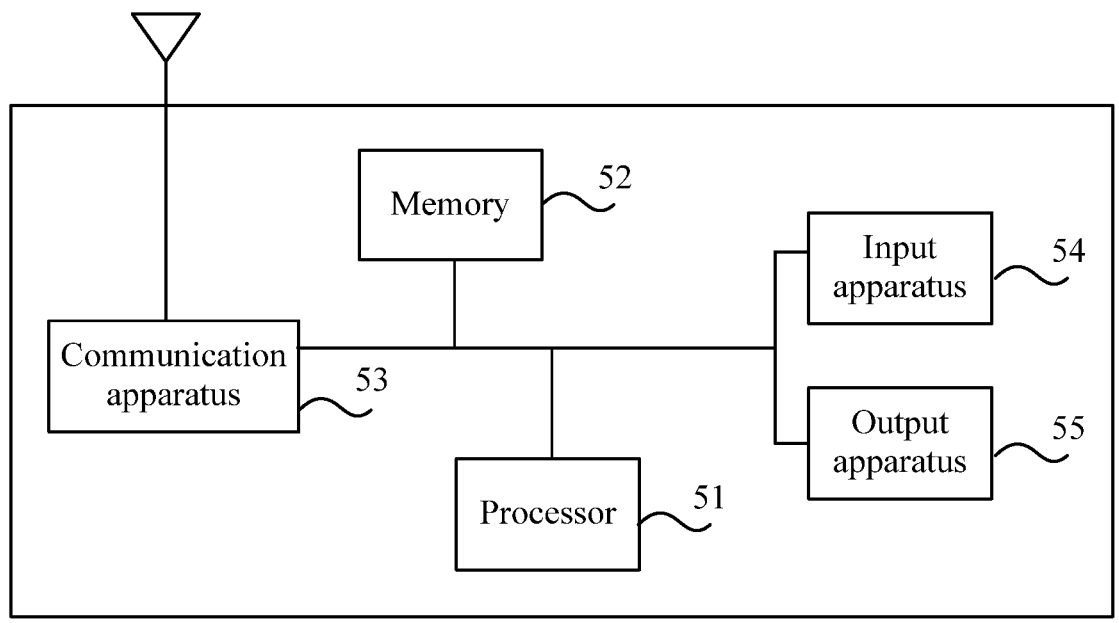
FIG. 6 is a hardware schematic diagram of a terminal according to an embodiment.

A terminal is further provided according to an embodiment of the present application. FIG. 6 is a schematic structural diagram of a terminal according to the present application. As shown in FIG. 6, the terminal according to the present application includes a memory 52, a processor 51, and a computer program that can be stored in the memory and run on the processor, when the processor 51 executes the computer program, the above-mentioned session request method is implemented.

The terminal may further include a memory 52; one or more processors 51 may be in the terminal, and one processor 51 included is taken as an example in FIG. 6. The memory 52 is configured to store one or more programs. One or more programs are executed by one or more processors 51, to cause one or more processors 51 to implement the session request method as described in the embodiments of the present disclosure.

The terminal further includes a communication apparatus 53, an input apparatus 54, and an output apparatus 55.

The processor 51, the memory 52, the communication apparatus 53, the input apparatus 54, and the output apparatus 55 in the terminal may be connected via a bus or other means, and in FIG. 6, a connection via a bus is taken as an example.

The input apparatus 54 may be configured to receive input numeric or character information and to generate input of key-pressing signal related to user settings of the terminal and functional control of the terminal. The output apparatus 55 may include a display device such as a display screen.

The communication apparatus 53 may include a receiver and a transmitter. The communication apparatus 53 is configured to perform information transmission/reception communication under the control of the processor 51.

As a computer-readable storage medium, the memory 52 may be configured to store a software program, a computer-executable program, and a computer-executable module, such as the program instructions/modules corresponding to the session request method in the embodiments of the present disclosure (e.g., the generation module 310, the identifier determination module 320, the update module 330 and the request module 340 in the session request apparatus). The memory 52 may include a program storage area and a data storage area, where the program storage area may store an operating system and at least one application program for functions, and the data storage area may store data created during utilization of the terminal, etc. Further, the memory 52 may include a high-speed random access memory, and may further include a non-volatile memory, such as at least one magnetic disk storage apparatus, a flash memory device, or other non-volatile solid-state storage apparatus. In some examples, the memory 52 may include memories that are remotely provided for the processor 51, and these remote memories may be connected to the terminal through a network. Examples of the aforementioned network include, but are not limited to, the Internet, an intranet, a local area network, a mobile communication network, or any combination thereof.

A non-transitory computer-readable storage medium is further provided according to embodiments of the present disclosure, which stores a computer program. The computer program, when being executed by the processor, implements the session request method according to any one of the embodiments of the present disclosure, and the session request method includes: in a case where key agreement authentication is passed, generating an authentication server key; determining a key identifier of an AKMA anchor key according to the authentication server key; and in a case where the key identifier is invalid, updating the key identifier according to an MSIN; and sending an updated key identifier to the AF to request a key-based session.

The computer storage medium according to the embodiments of the present disclosure may adopt any combination of one or more computer-readable media. The computer-readable medium may be a computer-readable signal medium or a computer-readable storage medium. The computer-readable storage medium can be, for example, but is not limited to, an electrical, magnetic, optical, electromagnetic, infrared, or semiconductor system, apparatus or device, or a combination of any of the foregoing. Examples (non-exhaustive list) of computer-readable storage media include electrical connections having one or more wires, portable computer disks, hard disks, random access memory (RAM), read-only memory (ROM), erasable programmable read-only memory (EPROM), flash memory, optical fiber, portable CD-ROM, optical storage device, magnetic storage device, or any suitable combination of the foregoing. A computer-readable storage medium can be any tangible medium that contains or stores a program, the program can be used by or in connection with an instruction execution system, apparatus, or device.

The computer-readable signal medium may include a data signal propagated in a baseband or as part of a carrier wave, with computer-readable program code embodied in the computer-readable signal medium. Such propagated data signals may take a variety of forms, including but not limited to electromagnetic signals, optical signals, or any suitable combination of the foregoing. The computer-readable signal medium can also be any computer-readable medium, in addition to the computer-readable storage medium, that can transmit, propagate, or transport the program for being used by or in connection with the instruction execution system, instruction execution apparatus, or device.

Program codes embodied on a computer-readable medium may be transmitted by any suitable medium including but not limited to a wireless medium, a wired medium, an optical fiber cable, a radio frequency (RF), etc., or, any suitable combination of the foregoing media.

Computer program codes for performing the operations of the present disclosure may be written with one or more programming languages or their combinations, the programming languages include object-oriented programming languages—such as Java, Smalltalk, and C++, and further include procedural programming languages—such as the "C" language or similar programming language. The program codes may be executed entirely on the user's computer, executed partly on the user's computer, executed as a stand-alone software package, executed partly on the user's computer and partly on a remote computer, or executed entirely on a remote computer or a server. Where a remote computer is involved, the remote computer may be connected to the user's computer through any kind of network, including a local area network (LAN) or wide area network (WAN), or may be connected to an external computer (e.g., connected through the internet provided by an internet service provider).

It is to be understood by the person skilled in the art that the term "user terminal" encompasses any appropriate type of radio user device, such as a mobile phone, a portable data processing apparatus, a portable web browser, or a vehicle-mounted mobile station.

In general, the various embodiments of the present disclosure may be implemented in hardware or a dedicated circuit, software, logic, or any combination thereof. For example, some aspects of the various embodiments may be implemented in hardware, while other aspects of the various embodiments may be implemented in firmware or software that may be executed by a controller, a microprocessor, or other computing apparatuses, and the present disclosure is not limited thereto.

Embodiments of the present disclosure may be implemented by a data processor of a mobile apparatus executing computer program instructions, for example, the embodiments of the present disclosure may be implemented in a processor entity, by hardware, or by a combination of software and hardware. The computer program instructions may be assembly instructions, instruction set architecture (ISA) instructions, machine instructions, machine-related instructions, micro-codes, firmware instructions, state setting data, or source codes or object codes written in any combination of one or more programming languages.

The block diagrams of any logic flow in drawings of the present disclosure may represent program steps, or may represent interconnected logic circuits, modules, and functions, or may represent a combination of program steps, logic circuits, modules, and functions. The computer programs may be stored in a memory. The memory may be of any type suitable for a local technical environment and may be implemented using any suitable data storage technology, such as but not limited to, a read-only memory (ROM), a random-access memory (RAM), and an optical memory apparatus and system (digital video disk (DVD) or compact disc (CD). The computer-readable storage medium may include a non-transitory storage medium. The data processor may be of any type appropriate for the local technical environment such as, but not limited to, a general-purpose computer, a special-purpose computer, a microprocessor, a digital signal processor (DSP), an application-specific integrated circuit (ASIC), a field-programmable gate array (FPGA), or a processor based on a multi-core processor architecture.

What is claimed is:

1. A session request method, comprising:
   in a case where key agreement authentication is passed, generating an authentication server key;
   determining, according to the authentication server key, a key identifier of an authentication and key management for applications (AKMA) anchor key;
   in a case where the key identifier is invalid, updating the key identifier according to a mobile subscriber identification number (MSIN); and
   sending an updated key identifier to an application function to request a key-based session;
   wherein the key identifier is invalid comprises: a routing indicator (RID) in the key identifier is null, an invalid value, or a default value; and
   wherein the updating the key identifier according to the MSIN comprises:
   determining a number of bits of the RID:
   selecting, according to a local policy, values of corresponding number of bits from the MSIN, and fill the RID with the values of the corresponding number of bits: and
   updating the key identifier according to the filled RID.

2. The method according to claim 1, wherein the local policy comprises one of:
   selecting values of first corresponding number of bits from the MSIN;
   selecting values of corresponding number of bits starting from a set position from the MSIN; or,
   selecting values of last corresponding number of bits from the MSIN.

3. The method according to claim 1, further comprising:
   requesting an authentication server function (AUSF) and a unified data management (UDM) function to perform key agreement authentication through an authentication and key agreement (AKA) mechanism or an AKA extensible authentication protocol.

4. The method according to claim 1, wherein the MSIN pertains to a subscription permanent identifier (SUPI); and a type of the SUPI is an international mobile subscriber identification number (IMSI).

5. The method according to claim 1, further comprising:
   determining an application key according to the AKMA anchor key to encrypt an application layer.

6. A terminal comprising a memory, a processor, and a computer program stored in the memory and executable by the processor, wherein the processor, when executing the computer program, implements:
   in a case where key agreement authentication is passed, generating an authentication server key;
   determining, according to the authentication server key, a key identifier of an authentication and key management for applications (AKMA) anchor key;
   in a case where the key identifier is invalid, updating the key identifier according to a mobile subscriber identification number (MSIN); and
   sending an updated key identifier to an application function to request a key-based session;
   wherein the key identifier is invalid comprises: a routing indicator (RID) in the key identifier is null, an invalid value, or a default value; and
   wherein the processor, when executing the computer program, implements:
   determining a number of bits of the RID;
   selecting, according to a local policy, values of corresponding number of bits from the MSIN, and fill the RID with the values of the corresponding number of bits; and
   updating the key identifier according to the filled RID.

7. The terminal according to claim 6, wherein the local policy comprises one of:
   selecting values of first corresponding number of bits from the MSIN;
   selecting values of corresponding number of bits starting from a set position from the MSIN; or,
   selecting values of last corresponding number of bits from the MSIN.

8. The terminal according to claim 6, wherein the processor, when executing the computer program, implements:
   requesting an authentication server function (AUSF) and a unified data management (UDM) function to perform key agreement authentication through an authentication and key agreement (AKA) mechanism or an AKA extensible authentication protocol.

9. The terminal according to claim 6, wherein the MSIN pertains to a subscription permanent identifier (SUPI); and a type of the SUPI is an international mobile subscriber identification number (IMSI).

10. The terminal according to claim 6, wherein the processor, when executing the computer program, implements:
    determining an application key according to the AKMA anchor key to encrypt an application layer.

11. A non-transitory computer-readable storage medium, storing a computer program, wherein the computer program, when executed by a processor, implements:

in a case where key agreement authentication is passed, generating an authentication server key;

determining, according to the authentication server key, a key identifier of an authentication and key management for applications (AKMA) anchor key;

in a case where the key identifier is invalid, updating the key identifier according to a mobile subscriber identification number (MSIN); and sending an updated key identifier to an application function to request a key-based session;

wherein the key identifier is invalid comprises: a routing indicator (RID) in the key identifier is null, an invalid value, or a default value; and wherein the computer program, when executed by the processor, implements:

determining a number of bits of the RID;

selecting, according to a local policy, values of corresponding number of bits from the MSIN, and fill the RID with the values of the corresponding number of bits; and updating the key identifier according to the filled RID.

12. The storage medium according to claim 11, wherein the local policy comprises one of:

selecting values of first corresponding number of bits from the MSIN;

selecting values of corresponding number of bits starting from a set position from the MSIN; or, selecting values of last corresponding number of bits from the MSIN.

13. The storage medium according to claim 11, wherein the computer program, when executed by a processor, implements:

requesting an authentication server function (AUSF) and a unified data management (UDM) function to perform key agreement authentication through an authentication and key agreement (AKA) mechanism or an AKA extensible authentication protocol.

* * * * *